(12) United States Patent
Kitano

(10) Patent No.: US 11,016,290 B2
(45) Date of Patent: May 25, 2021

(54) LIGHT CONTROL DEVICE, LIGHT CONTROL METHOD AND PROGRAM

(71) Applicant: PIONEER CORPORATION, Tokyo (JP)

(72) Inventor: Kazutoshi Kitano, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 305 days.

(21) Appl. No.: 16/088,774

(22) PCT Filed: Mar. 29, 2016

(86) PCT No.: PCT/JP2016/060166
§ 371 (c)(1),
(2) Date: Sep. 26, 2018

(87) PCT Pub. No.: WO2017/168576
PCT Pub. Date: Oct. 5, 2017

(65) Prior Publication Data
US 2019/0079282 A1 Mar. 14, 2019

(51) Int. Cl.
| | | |
|---|---|---|
| *G02B 26/08* | (2006.01) | |
| *G02B 26/10* | (2006.01) | |
| *B60R 21/00* | (2006.01) | |
| *G08G 1/16* | (2006.01) | |
| *G01S 17/42* | (2006.01) | |
| *G01S 7/497* | (2006.01) | |
| *G01S 17/86* | (2020.01) | |
| *G01S 17/931* | (2020.01) | |
| *G01S 17/10* | (2020.01) | |

(52) U.S. Cl.
CPC ............. *G02B 26/10* (2013.01); *B60R 21/00* (2013.01); *G01S 7/4972* (2013.01); *G01S 17/10* (2013.01); *G01S 17/42* (2013.01); *G01S 17/86* (2020.01); *G01S 17/931* (2020.01); *G08G 1/16* (2013.01)

(58) Field of Classification Search
CPC ........ G02B 26/10; G01S 17/86; G01S 17/931; G01S 17/42; G01S 7/4972; G01S 17/10; G01S 17/89; B60R 21/00; G08G 1/16
USPC ........................................ 359/197.1
See application file for complete search history.

(56) References Cited

U.S. PATENT DOCUMENTS

| 8,473,144 B1 | 6/2013 | Dolgov et al. | |
|---|---|---|---|
| 9,580,072 B2 * | 2/2017 | Sudou .................. | B60W 30/16 |

(Continued)

FOREIGN PATENT DOCUMENTS

| JP | S60-153400 U | 10/1985 |
|---|---|---|
| JP | H7-209423 A | 8/1995 |
| JP | H8-327722 A | 12/1996 |

(Continued)

OTHER PUBLICATIONS

International Search Report for related International Application No. PCT/JP2016/060166, dated May 10, 2016; 1 page.

*Primary Examiner* — Euncha P Cherry
(74) *Attorney, Agent, or Firm* — Procopio, Cory, Hargreaves & Savitch LLP

(57) ABSTRACT

The light control device emits a light from the emission unit, and receives the light reflected by an object by the light receiving unit. The acquisition unit acquires inclination information related to an inclination of the movable body, and the controller controls an emission direction of the light emitted by the emission unit based on the inclination information.

5 Claims, 16 Drawing Sheets

(56) References Cited

U.S. PATENT DOCUMENTS

2003/0046025 A1* 3/2003 Jamieson ................ G01S 7/481
  702/159
2014/0121880 A1 5/2014 Dolgov et al.

FOREIGN PATENT DOCUMENTS

JP 2004317134 A 11/2004
JP 2014-89691 A 5/2014

* cited by examiner

- EFFECTIVE HORIZONTAL FIELD OF VIEW RANGE: $\theta t = 270°$
- NUMBER OF SEGMENTS PER LAYER: 900seg
- HORIZONTAL ANGLE RESOLUTION: $\Delta\theta = 360/900 = 0.4°/\text{seg}$

- VERTICAL FIELD OF VIEW RANGE: $(n-1) \times \Delta\phi = 30°$
- NUMBER OF HELICAL LAYERS (TURNS): $n = 7$
- VERTICAL ANGLE RESOLUTION: $\Delta\phi = 35/7 = 5°/\text{LAYER}$

LIGHT CONTROL DEVICE, LIGHT CONTROL METHOD AND PROGRAM

CROSS-REFERENCE TO RELATED APPLICATIONS

This application is a U.S. National Stage entry of PCT Application No: PCT/JP2016/060166 filed Mar. 29, 2016, the contents of which are incorporated herein by reference.

TECHNICAL FIELD

The present invention relates to a light control device which controls a transition of an emitted light.

BACKGROUND TECHNIQUE

There is known a LIDAR which scans a horizontal direction while intermittently emitting a laser light, and detects point groups on a surface of an object by receiving a reflected light. Patent Reference 1 discloses a technique of scanning surroundings one-dimensionally or two-dimensionally by a LIDAR installed in a vehicle to detect information on a situation surrounding the vehicle.

PRIOR ART REFERENCE

Patent Reference

Patent Reference 1: Japanese Patent Application laid-Open under No. 2014-89691

SUMMARY OF THE INVENTION

Problem to be Solved by the Invention

In order to obtain information on the situation of surroundings three-dimensionally, it is necessary to use a multilayer-type LIDAR. However, the multilayer-type LIDAR takes very high cost because it needs a light transmitter/receiver for each of the layers. Additionally, if a movable body such as a vehicle equipped with the LIDAR is inclined, the direction of the laser light emitted by the LIDAR varies accordingly, and it becomes difficult to correctly detect objects.

The above is an example of the problem to be solved by the present invention. It is an object of the present invention to provide a light control device capable of acquiring three-dimensional information by using a single transmitter/receiver even if a movable body is inclined.

Means for Solving the Problem

An invention described in claims is a light control device mounted on a movable body, comprising: an emission unit configured to emit a light; a light receiving unit configured to receive the light reflected by an object; an acquisition unit configured to acquire inclination information related to an inclination of the movable body; and a controller configured to control an emission direction of the light emitted by the emission unit based on the inclination information.

Another invention described in claims is a light control method executed by a light control device mounted on a movable body and comprising an emission unit configured to emit a light; and a light receiving unit configured to receive the light reflected by an object, the method comprising: an acquiring process which acquires inclination information related to an inclination of the movable body; and a controlling process which controls an emission direction of the light emitted by the emission unit based on the inclination information.

Another invention described in claims is a program executed by a light control device mounted on a movable body and comprising an emission unit configured to emit a light; a light receiving unit configured to receive the light reflected by an object; and a computer, the program causing the computer to function as: an acquisition unit configured to acquire inclination information related to an inclination of the movable body; and a controller configured to control an emission direction of the light emitted by the emission unit based on the inclination information.

Another invention described in claims is a light control device mounted on a movable body, comprising: an emission unit configured to emit a light; a light receiving unit configured to receive the light reflected by an object; an acquisition unit configured to acquire inclination information related to an inclination of the movable body; and a controller configured to control an emission direction of the light emitted by the emission unit based on the inclination information such that a locus of the light emitted by the emission unit becomes a constant shape regardless of the inclination.

DETAILED DESCRIPTION OF THE PREFERRED EMBODIMENTS

Figure 1:
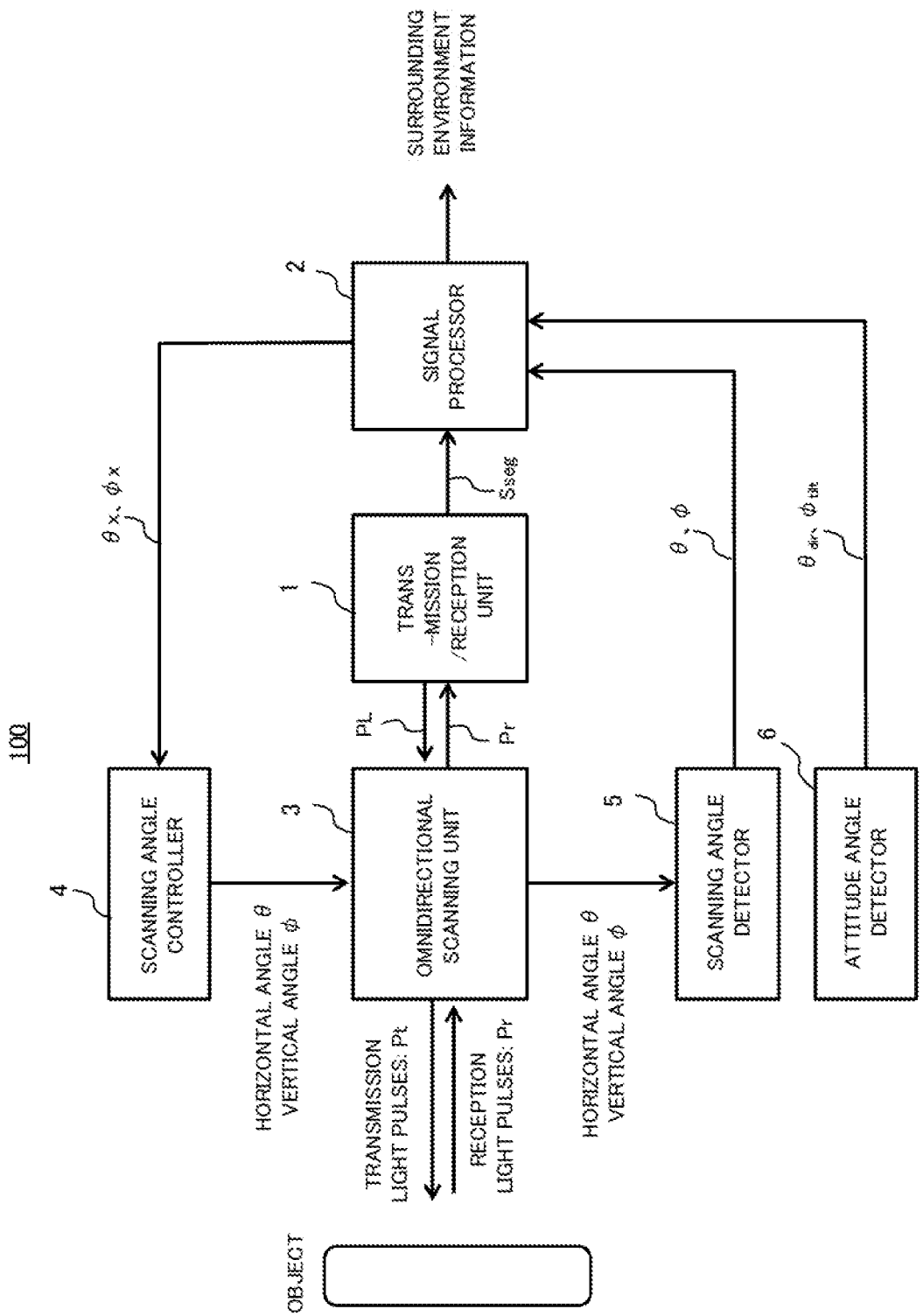
FIG. 1 is a block diagram illustrating a configuration of a LIDAR unit according to embodiments.

According to one aspect of the present invention, there is provided a light control device mounted on a movable body, comprising: an emission unit configured to emit a light; a light receiving unit configured to receive the light reflected by an object; an acquisition unit configured to acquire inclination information related to an inclination of the movable body; and a controller configured to control an emission direction of the light emitted by the emission unit based on the inclination information.

The above light control device emits a light from the emission unit, and receives the light reflected by an object by the light receiving unit. The acquisition unit acquires inclination information related to an inclination of the movable body, and the controller controls an emission direction of the light emitted by the emission unit based on the inclination information. Thereby, it becomes possible to appropriately control the direction of the emitted light in accordance with the inclination of the movable body.

In one mode of the above light control device, the inclination information includes information indicating a directional angle of the movable body in a first direction and an inclination angle of the movable body in a second direction crossing the first direction. In this mode, the emission direction of the light is controlled based on the directional information in the first direction and the inclination angle in the second direction.

In another mode of the above light control device, the inclination information includes a directional angle of a rotational movement of the movable body in a first direction, an amplitude angle of the rotational movement in a second direction crossing the first direction, and a frequency of the rotational movement. In this mode, the emission direction of the light is controlled based on the directional angle, the amplitude angle and the frequency of the rotational movement.

In still another mode of the above light control device, the controller controls the emission unit to continuously move the light emitted by the emission unit in the first direction and the second direction such that a transition locus of the light becomes helical. In this mode, since the light is emitted such that the transition locus becomes helical, it is possible to receive light reflected by the objects in all directions.

Still another mode of the above light control device further comprises a detector configured to detect at least one of a distance to the object and an angle of the object, based on light receiving result of the light receiving unit. In this mode, at least one of the distance to the object and the angle of the object can be obtained based on the light receiving result of the light receiving unit.

According to another aspect of the present invention, there is provided a light control method executed by a light control device mounted on a movable body and comprising an emission unit configured to emit a light; and a light receiving unit configured to receive the light reflected by an object, the method comprising: an acquiring process which acquires inclination information related to an inclination of the movable body; and a controlling process which controls an emission direction of the light emitted by the emission unit based on the inclination information. Also by this method, it becomes possible to appropriately control the direction of the emitted light in accordance with the inclination of the movable body.

According to still another aspect of the present invention, there is provided a program executed by a light control device mounted on a movable body and comprising an emission unit configured to emit a light; a light receiving unit configured to receive the light reflected by an object; and a computer, the program causing the computer to function as: an acquisition unit configured to acquire inclination information related to an inclination of the movable body; and a controller configured to control an emission direction of the light emitted by the emission unit based on the inclination information. By executing the program by the computer, it becomes possible to appropriately control the direction of the emitted light in accordance with the inclination of the movable body.

According to still another aspect of the present invention, there is provided a light control device mounted on a movable body, comprising: an emission unit configured to emit a light; a light receiving unit configured to receive the light reflected by an object; an acquisition unit configured to acquire inclination information related to an inclination of the movable body; and a controller configured to control an emission direction of the light emitted by the emission unit based on the inclination information such that a locus of the light emitted by the emission unit becomes a constant shape regardless of the inclination.

The above light control device emits a light from the emission unit, and receives the light reflected by an object by the light receiving unit. The acquisition unit acquires inclination information related to an inclination of the movable body, and the controller controls an emission direction of the light emitted by the emission unit based on the inclination information such that a locus of the light emitted by the emission unit becomes a constant shape regardless of the inclination. Thereby, it becomes possible to appropriately control the direction of the emitted light in accordance with the inclination of the movable body.

Embodiments

Preferred embodiments of the present invention will be described below with reference to the attached drawings.

[Configuration]

FIG. 1 is a block diagram illustrating a configuration of a LIDAR unit 100 according to embodiments of a light control device of the present invention. The LIDAR unit 100 of the embodiments is loaded on a movable body such as a vehicle. The LIDAR unit 100 is a LIDAR (LIght Detection And Ranging, or Laser Illuminated Detection And Ranging) of TOF (Time Of Flight) system, and measures a distance to a body (object) in an omnidirectional and horizontal direction. As illustrated, the LIDAR unit 100 includes a transmission/reception unit 1, a signal processor 2, an omnidirectional scanning unit 3, a scanning angle controller 4, a scanning angle detector 5 and an attitude angle detector 6.

The transmission/reception unit 1, including a laser diode or the like, generates laser pulses PL and supplies them to the omnidirectional scanning unit 3. The omnidirectional scanning unit 3 emits the laser pulses (hereinafter referred to as "transmission light pulses Pt") omnidirectionally, i.e., to 360° in the horizontal direction, while vertically shifting the emission direction. At that time, the omnidirectional scanning unit 3 emits the transmission light pulses Pt at each of segments (900 segments in this embodiment) obtained by dividing the omnidirection, i.e., 360° in the horizontal direction by equal angles. Further, the omnidirectional scanning unit 3 receives reflected lights (hereinafter referred to as "reception light pulses Pr") of the transmission light pulses Pt within a predetermined time period after emitting the transmission light pulses Pt, and supplies them to the transmission/reception unit 1. The transmission/reception unit 1 generates a signal (hereinafter referred to as "a segment signal Sseg") associated with a light reception intensity at each segment based on the reception light pulses Pr, and outputs it to the signal processor 2.

The scanning angle detector 5 detects a horizontal angle $\theta$ and a vertical angle $\phi$ indicating the emission direction of the transmission light pulses Pt emitted by the omnidirectional scanning unit 3, and supplies them to the signal processor 2.

The attitude angle detector 6 may be a sensor mounted on a vehicle, for example, and detects an attitude of the vehicle equipped with the LIDAR unit 100. Specifically, the attitude angle detector 6 detects an inclination of the vehicle caused by an external (road) environment to detect an angle $\theta_{dir}$ of the vehicle in the inclination direction of the vehicle (hereinafter referred to as "inclination direction") and an angle $\phi_{tilt}$ of the inclination of the vehicle (hereinafter referred to as "inclination angle"), and supplies them to the signal processor 2 as inclination estimation values indicating the inclination. It is noted that the inclination of the vehicle discussed herein does not mean the inclination (mounting error) caused when the LIDAR unit 100 is mounted to the vehicle. Alternatively, the attitude angle detector 6 may detect a pitching movement of the vehicle to detects a direction $\theta_{dir}$, a frequency $f_{pitch}$ and an amplitude $\phi_{pitch}$ of the pitching movement and a phase shift $p_{pitch}$ of the pitching movement with respect to a frame time, and supplies them to the signal processor 2 as pitching movement estimation values indicating the pitching movement. As the attitude angle detector 6, instead of mounting the sensor to the vehicle, the sensor may be mounted to the omnidirectional scanning unit 3 to detect the inclination of the omnidirectional scanning unit 3 itself.

The signal processor 2 outputs surrounding environment information including at least one of a distance to an object and an angle of the object, based on the segment signal Sseg for each segment received from the transmission/reception unit 1. The surrounding environment information indicates surrounding environment of the vehicle equipped with the LIDAR unit 100, and specifically indicates the distances and angles of the objects existing in all directions from the vehicle as a center.

The signal processor 2 generates a target horizontal angle $\theta_x$ and a target vertical angle $\phi_x$, serving as the control targets, based on the horizontal angle $\theta$ and the vertical angle $\phi$ detected by the scanning angle detector 5, and supplies them to the scanning angle controller 4. The scanning angle controller 4 controls the scanning angle of the transmission light pulses Pt by the omnidirectional scanning unit 3, based on the target horizontal angle $\theta_x$ and the target vertical angle $\phi_x$ supplied from the signal processor 2. Thus, the omnidirectional scanning unit 3 is controlled to emit the transmission light pulses Pt to the target horizontal angle $\theta_x$ and the target vertical angle $\phi_x$.

When the attitude angle detector 6 detects the inclination or the pitching movement of the vehicle, the signal processor 2 generates a vertical angle $\phi$ after correcting the variation of the scanning angle caused by the inclination or the pitching movement of the vehicle (hereinafter referred to as "corrected vertical angle") based on the scanning angle $\theta$ detected by the scanning angle detector 5 and the inclination estimation values or the pitching movement estimation values detected by the attitude detecting unit 6, and supplies it to the scanning angle controller 4 as the target vertical angle $\phi_x$. Thus, the scanning angle controller 4 can control the scanning angle of the transmission light pulses Pt so as to correct influence by the inclination or the pitching movement of the vehicle.

Figure 2:
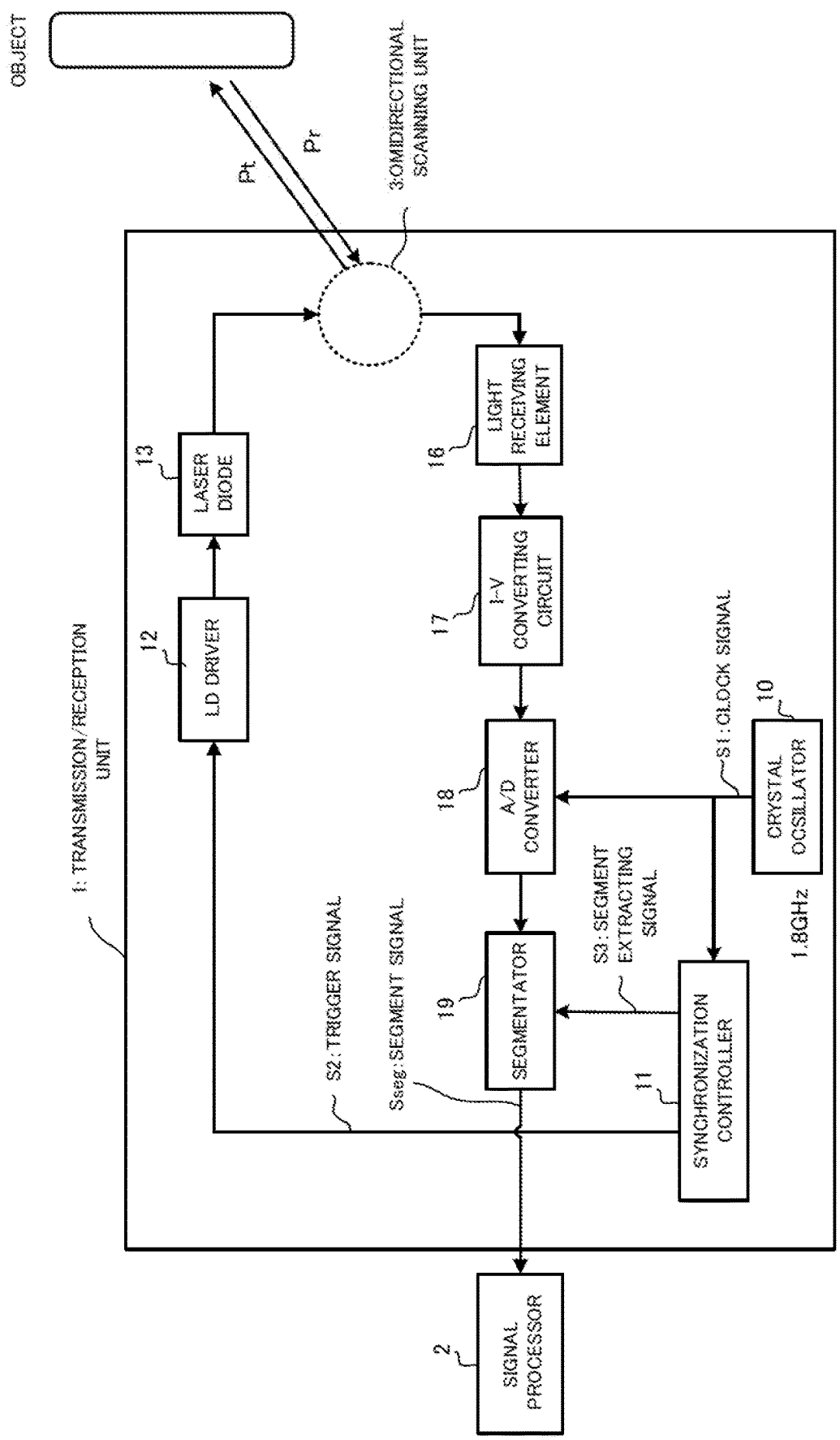
FIG. 2 is a block diagram illustrating a configuration of a light transmission/reception unit.

Next, the transmission/reception unit 1 will be described in detail. FIG. 2 illustrates the configuration of the transmission/reception unit 1. The transmission/reception unit 1 mainly includes a crystal oscillator 10, a synchronization controller 11, an LD driver 12, a laser diode (LD) 13, a light receiving element 16, a current-voltage converting circuit (a trans-impedance amplifier) 17, an A/D converter 18 and a segmentator 19.

The crystal oscillator 10 outputs a pulse-type clock signal S1 to the synchronization controller 11 and the A/D converter 18. In the embodiments, as an example, the clock frequency is 1.8 GHz. In the following description, the clocks of the clock signal S1 is referred to as "sample clocks".

Figure 3:
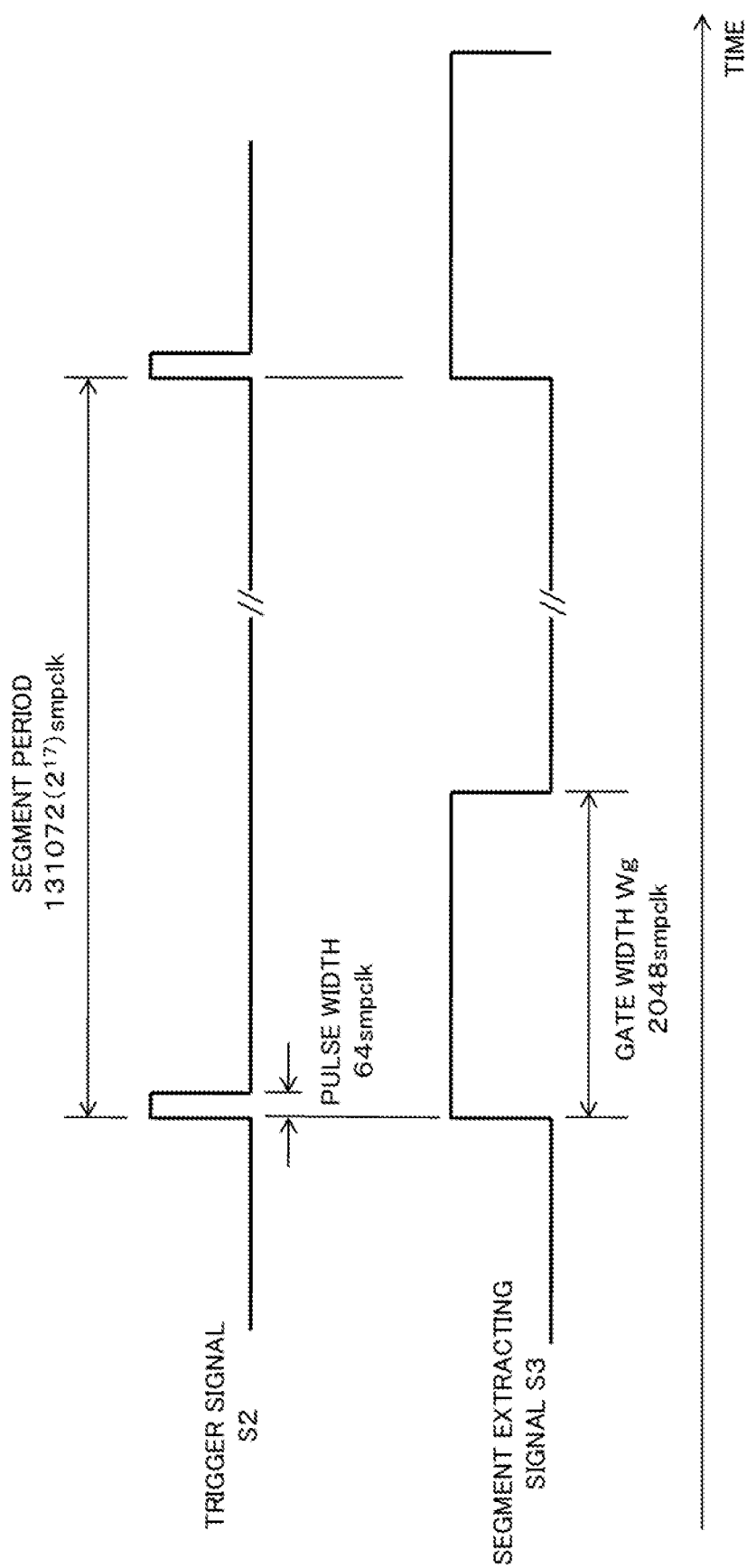
FIG. 3 illustrates waveforms of a trigger signal and a segment extracting signal.

The synchronization controller 11 outputs a pulse-type signal (hereinafter referred to as "a trigger signal S2") to the LD driver 12. In the embodiments, the trigger signal S2 is periodically asserted by the period of 131072 ($=2^{17}$) sample clocks. In the following description, the time period from the time when the trigger signal S2 is asserted to the time when the trigger signal S2 is asserted next time is referred to as "a segment period". The synchronization controller 11 outputs, to the segmentator 19, a signal (hereinafter referred to as "a segment extracting signal S3") determining the timing at which the segmentator 19 described later extracts the output of the A/D converter 18. The trigger signal S2 and the segment extracting signal S3 are logic signals, and are synchronized with each other as shown in FIG. 3 described later. In the embodiments, the synchronization controller 11 asserts the segment extracting signal S3 for the time width (referred to as "a gate width Wg") of 2048 sample clocks.

The LD driver 12 applies the pulse current to the laser diode 13 in synchronization with the trigger signal S2 inputted from the synchronization controller 11. The laser diode 13 is an infrared (905 nm) pulse laser, for example, and emits the light pulses based on the pulse current supplied from the LD driver 12. In the embodiments, the laser diode 13 emits the light pulses of approximately 5 nsec.

The light pulses emitted from the laser diode 13 is transmitted to the omnidirectional scanning unit 3 via an optical system. The omnidirectional scanning unit 3 emits the transmission light pulses Pt, and receives the light pulses reflected by the objects as the reception light pulses Pr to supply them to the light receiving element 16.

The light receiving element 16 is an avalanche diode, for example, and generates a weak current corresponding to the light quantity of the reception light pulses Pr guided by the omnidirectional scanning unit 3. The light receiving element 16 supplies the generated weak current to the current-voltage converting circuit 17. The current-voltage converting circuit 17 amplifies the weak current supplied from the light receiving element 16 and converts it to a voltage signal, and inputs the converted voltage signal to the A/D converter 18.

The A/D converter 18 converts the voltage signal supplied from the current-voltage converting circuit 17 to a digital signal based on the clock signal S1 supplied from the crystal oscillator 10, and supplies the converted digital signal to the segmentator 19. In the following description, the digital signal that the A/D converter 18 generates every one clock will be referred to as "a sample".

The segmentator 19 generates the digital signal outputted by the A/D converter 18 during 2048 sample clocks in the period of the gate width Wg, during which the segment extracting signal S3 is being asserted, as the segment signal Sseg. The segmentator 19 supplies the generated segment signal Sseg to the signal processor 2.

FIG. 3 illustrates waveforms of the trigger signal S2 and the segment extracting signal S3 in time series. As illustrated in FIG. 3, in the embodiments, the segment period, which is a one-cycle period of asserting the trigger signal S2, is set to the length of 131072 sample clocks (shown as "smpclk" in FIG. 3). The pulse width of the trigger signal S2 is set to the length of 64 sample clocks, and the gate width Wg is set to the length of 2048 sample clocks.

In this case, since the segment extracting signal S3 is asserted for the time period of the gate width Wg after the trigger signal S2 is asserted, the segmentator 19 extracts 2048 samples outputted by the A/D converter 18 while the trigger signal S2 is asserted. As the gate width Wg becomes longer, the maximum measurement distance (limit measurement distance) from the LIDAR unit 100 becomes longer.

Figure 4A:
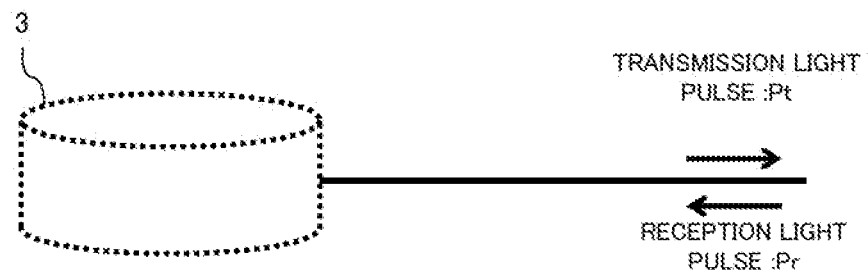
FIGS. 4A to 4C schematically illustrate operation of an omnidirectional scanning unit.
Figure 4B:
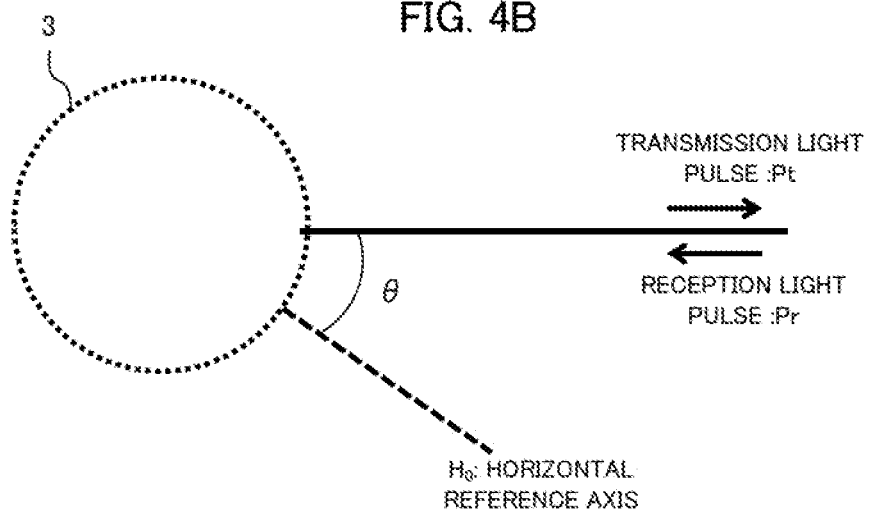
Figure 4C:
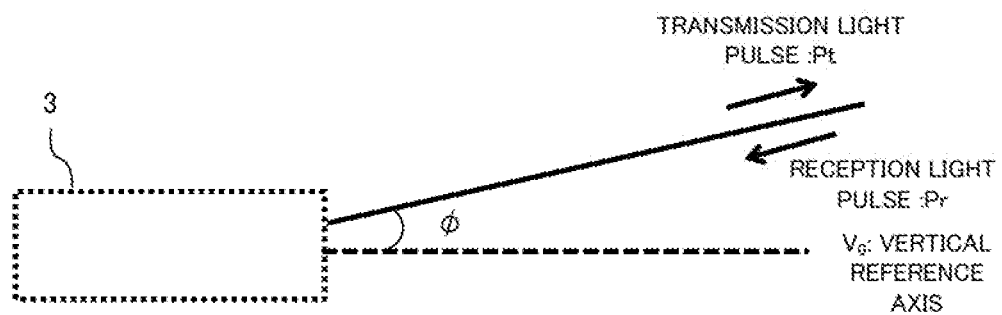

Next, the omnidirectional scanning unit 3 will be described in detail. The omnidirectional scanning unit 3 is configured by a rotatable mirror and an optical system for scanning the transmission light pulses Pt in 360°, for example. The direction (hereinafter referred to as "an emission direction") in which the omnidirectional scanning unit 3 transmits and receives the light pulses to and from the surrounding environment is determined by the horizontal angle θ and the vertical angle φ. FIGS. 4A to 4C illustrate examples of scanning conditions by the omnidirectional scanning unit 3. FIG. 4A is a perspective view showing the condition where the omnidirectional scanning unit 3 is horizontally scanning. FIG. 4B is a plan view showing the scanning condition of the omnidirectional scanning unit 3 observed from above. With respect to the predetermined horizontal reference axis $H_0$, the light pulses are scanned with the horizontal angle θ. The horizontal angle θ varies 360° [deg] with respect to the horizontal reference axis $H_0$. Namely, the light pulses can scan in all directions (0°-360°). FIG. 4C shows the condition where the omnidirectional scanning unit 3 is scanning upward in comparison with the horizontal scanning condition shown in FIG. 4A. Specifically, the omnidirectional scanning unit 3 is scanning the light pulses by the vertical angle φ with respect to the vertical reference axis $V_0$. In this way, the omnidirectional scanning unit 3 can perform the three-dimensional scanning by continuously varying the angles in the horizontal and vertical directions.

In the above configuration, the transmission/reception unit 1 is an example of the emission unit and the light receiving unit of the present invention, the attitude angle detector 6 is an example of the acquisition unit of the present invention, the signal processor 2, the omnidirectional scanning unit 3 and the scanning angle controller 4 are examples of the controller of the present invention, and the signal processor 2 is an example of the detector of the present invention.

[Scanning Control]

(Helical Scanning)

Next, the scanning control by the omnidirectional scanning unit 3 will be described. The omnidirectional scanning unit 3 performs multi-layer scanning in the vertical direction. Specifically, in the embodiments, the omnidirectional scanning unit 3 performs seven-layer (number of layers: n=7) helical scanning in the vertical direction.

Figure 5A:
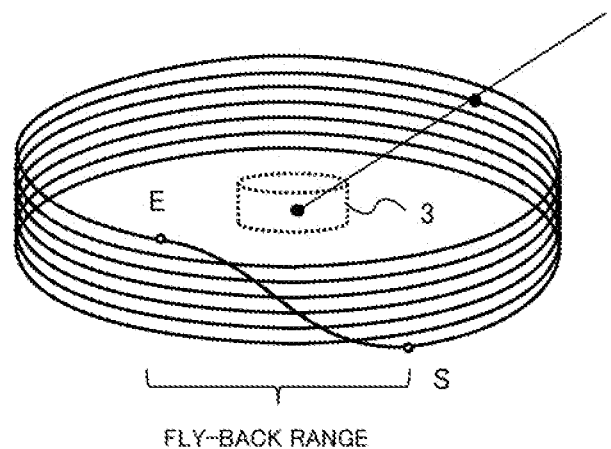
FIGS. 5A to 5C illustrate a locus of a helical scanning.
Figure 5B:
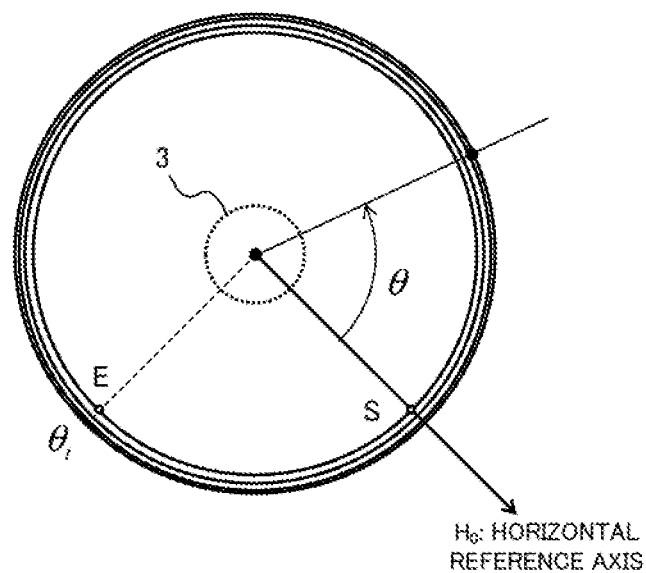
Figure 5C:
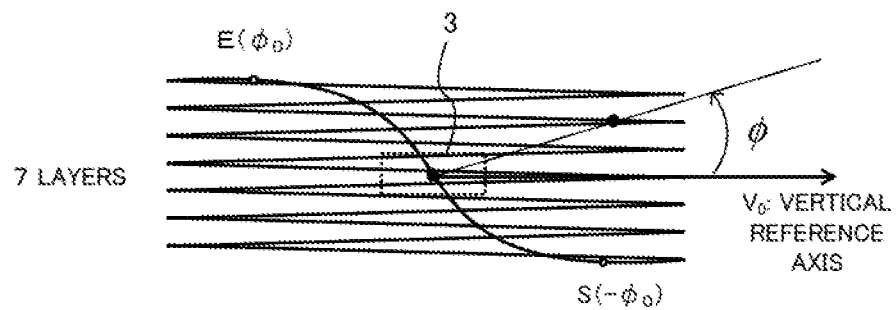

FIG. 5A to 5C illustrate a locus of the helical scanning. FIG. 5A is a perspective view of the locus by the helical scanning, FIG. 5B is a plan view of the locus by the helical scanning, and FIG. 5C is a side view of the locus by the helical scanning. FIGS. 5A to 5C illustrate the locus that a certain point in the emission direction of the transmission light pulses Pt creates by the scanning of the omnidirectional scanning unit 3. In other words, FIGS. 5A to 5C illustrate the loci that the transmission light pulses Pt emitted by the omnidirectional scanning unit 3 draw on a sphere surface of a certain radius in a space.

As illustrated, one (one-frame) helical scanning by the omnidirectional scanning unit 3 moves from the start point S to the end point E through seven-layer (seven-times wound) helical turns, and then returns to the start point S. The omnidirectional scanning unit 3 repeats this helical scanning. Specifically, during the one-frame helical scanning, the horizontal angle θ repeats the transition from 0° to 360° seven times. Meanwhile, the vertical angle φ varies from the vertical angle $-\phi_0$ at the start point S to the vertical angle $\phi_0$ at the end point E with a constant variation rate. The time period in which the emission direction of the transmission light pulses Pt returns from the end point E to the start point S will be referred to as "a fly-back range". The fly-back range is a range for returning the emission direction of the transmission light pulses Pt to a predetermined direction so as to repeat the helical scanning.

Figure 6A:
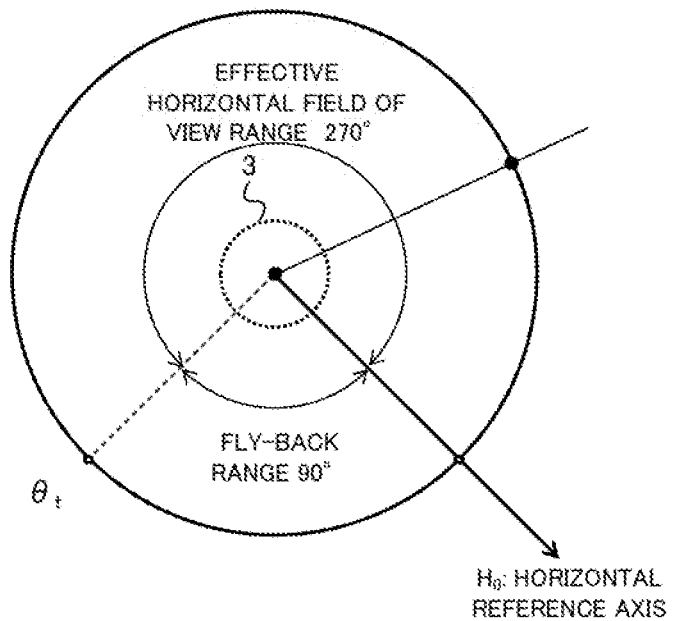
FIGS. 6A and 6B illustrate a scanning field of view by the helical scanning.

Next, a scanning field of view will be described. FIG. 6A illustrates a horizontal field of view of the helical scanning. In the embodiments, out of the omnidirection 360°, the fly-back range is set to 90° and the remaining 270° is referred to as "an effective horizontal field of view range $\theta_r$". Namely, $\theta_r$=270°. The effective horizontal field of view range is a range obtained by eliminating the fly-back range from the omnidirection 360°, wherein effective segment data can be obtained from the reception light pulses Pr. Now, assuming that 360° scanning by the omnidirectional scanning unit 3 corresponds to 900 segments, Number of segments per one turn=900.

Also, a horizontal angle resolution Δθ is:

Δθ=360/900=0.4°/seg.

Figure 6B:
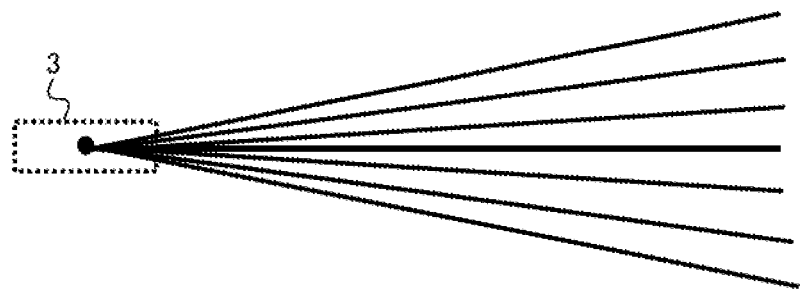

FIG. 6B illustrates the vertical field of view of the helical scanning. Supposing that the number of layers (number of turns) of the helical scanning is n(=7) and the vertical angle resolution of one layer is Δφ=5°, Vertical field of view range=(n−1)×Δφ=30°, and the vertical angle φ varies in the range: −15°≤φ≤15°. In the helical scanning, if the vertical angle φ is varied from the negative side to the positive side, the vertical angle φ is:

φ=−φ₀=−15°

Next, description will be given of the values of the horizontal angle θ and the vertical angle φ according to the above-mentioned helical scanning. It is now supposed that the omnidirectional scanning unit 3 performs the helical scanning according to the following specification.

Number of layers: n=7
Frame rate: $f_{frame}$=25 Hz
Lower limit of vertical field of view: φL=−10°
Upper limit of vertical field of view: φH=+10°
Fly-back starting horizontal angle (Effective horizontal field of view range): θ'$_r$=270°+360°×(7−1)=2430°
Fly-back ending horizontal angle: 360°

At this time, the scanning angular velocity ω, the horizontal angle θ, the horizontal scanning angle (accumulated in frame) $\theta'$ and the vertical angle $\phi$ are given by the following equation, wherein "t" is a time, "$g(\theta')$" is a function expressing fly-back, and "mod" is a modulo function.

$$\omega = 2\pi n f_{frame} \quad (1)$$
$$\theta = \mathrm{mod}(\omega t, 2\pi)$$
$$\theta' = \mathrm{mod}(\omega t, 2\pi n)$$
$$\begin{cases} \phi = \dfrac{\phi_H - \phi_L}{2\pi n}\theta' + \phi_L & 0 \le \theta' < \theta'_t \\ \phi = g(\theta' - \theta'_t) & \theta'_t \le \theta' < 2\pi n \end{cases}$$

Figure 7A:
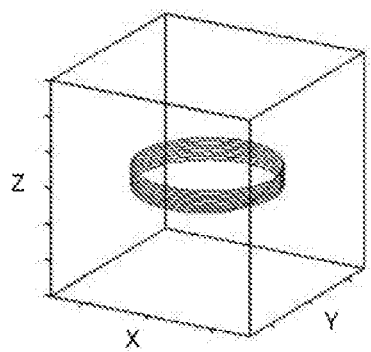
FIGS. 7A to 7D illustrate an example of a locus of the helical scanning.
Figure 7B:
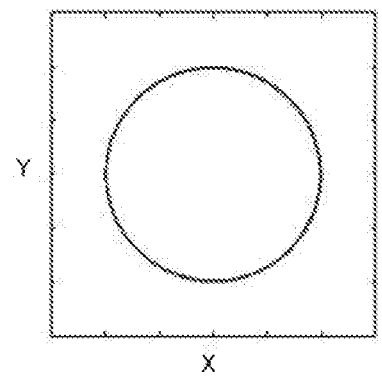
Figure 7C:
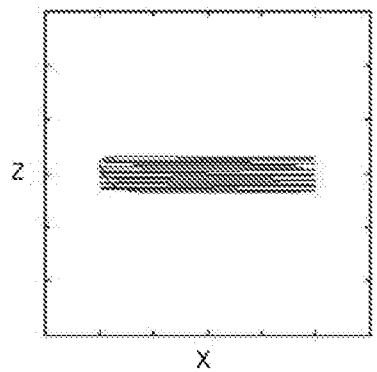
Figure 7D:
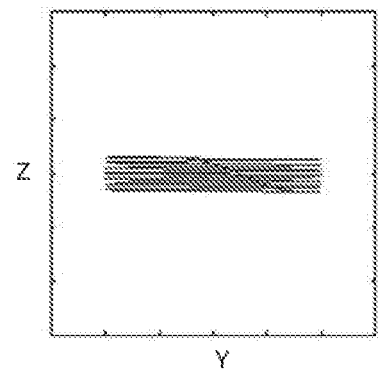

FIGS. 7A to 7D illustrate examples of a locus of the helical scanning when an inclination or a pitching movement of the vehicle is not occurring. FIG. 7A is a perspective view of the above helical scanning, FIG. 7B is an XY plan view, FIG. 7C is an XZ plan view and FIG. 7D is a YZ plan view.

(Adaptive Helical Scanning)

Next, description will be given of an adaptive helical scanning performed when the inclination or the pitching movement is occurring to the vehicle.

(i) 1st Embodiment

The first embodiment relates to the adaptive helical scanning when the vehicle is inclined. Now, it is supposed that the vehicle is equipped with the LIDAR unit 100 which performs the above-mentioned helical scanning. At this time, when the vehicle becomes inclined due to influence of vibration of the vehicle body such as pitching or rolling and/or unevenness of the road, the omnidirectional scanning unit 3 loaded on the vehicle also becomes inclined.

Figure 8A:
FIGS. 8A to 8D schematically illustrate a change of a detection condition of a target object caused by an inclination of a vehicle.
Figure 8B:
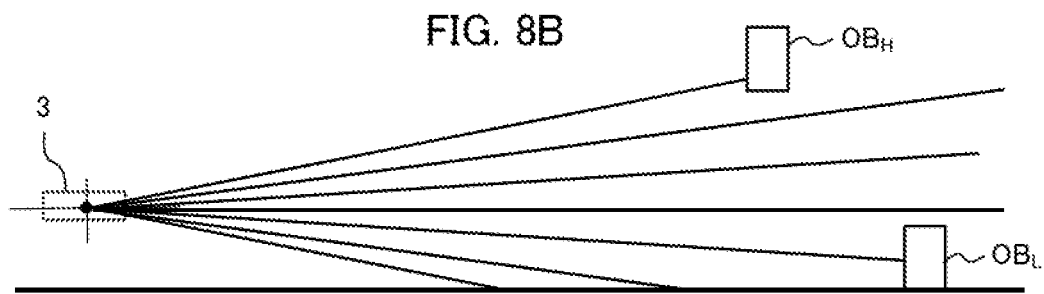
Figure 8C:
Figure 8D:
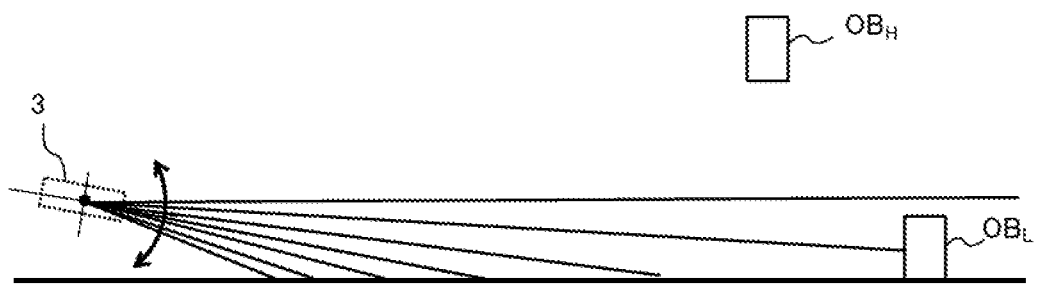

Specifically, when the vehicle V is not inclined as shown in FIG. 8A, the LIDAR unit 100 can detect the object $OB_L$ in the low position and the object $OB_H$ in the high position by the light beam emitted from the omnidirectional scanning unit 3 as shown in FIG. 8B. However, when the vehicle V is inclined downward as shown in FIG. 8C, the LIDAR unit 100 can detect the object $OB_L$ in the low position by the light beam, but cannot detect the object $OB_H$ in the high position as shown in FIG. 8D. Although it is not illustrated, when the vehicle V is inclined upward, the LIDAR unit 100 can detect the object $OB_H$ in the high position, but cannot detect the object $OB_L$ in the low position.

Figure 9A:
FIGS. 9A to 9D illustrates a correction of a scanning range by an adaptive helical scanning.
Figure 9B:
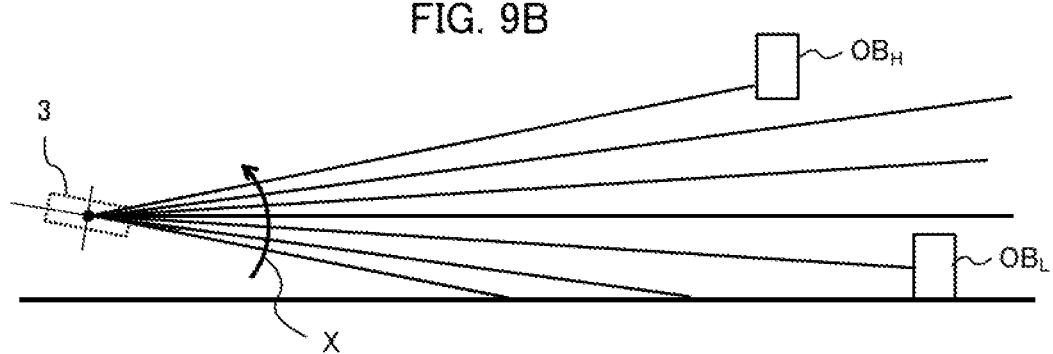
Figure 9C:
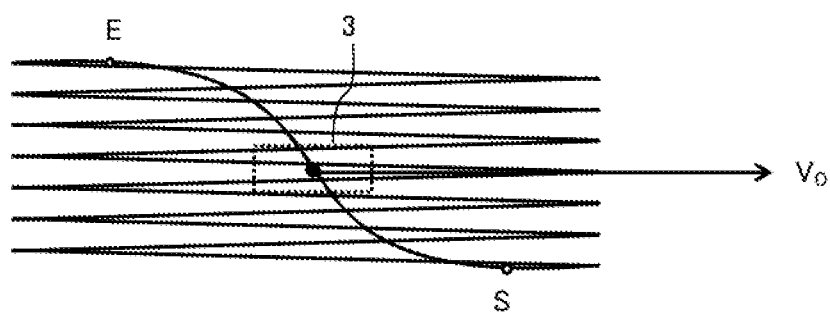
Figure 9D:
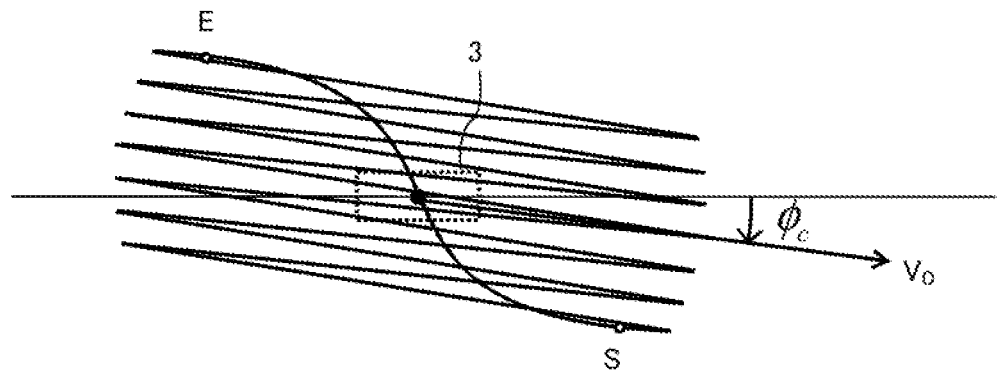

Therefore, when the vehicle is inclined, the vertical angle of the light beam emitted from the omnidirectional scanning unit 3 is corrected in accordance with the direction or the angle. For example, when the vehicle V is inclined downward as shown in FIG. 9A, the light beam emitted from the omnidirectional scanning unit 3 is corrected to be more upward than its normal emission direction as shown by the arrow X in FIG. 9B. FIG. 9C illustrates the locus of the helical scanning when the vehicle V is not inclined. In contrast, when the vehicle V is inclined downward by the angle $\phi c$ as shown in FIG. 9D, the omnidirectional scanning unit 3 changes the vertical angle of the helical scanning upward by the angle $\phi c$. Namely, the omnidirectional scanning unit 3 directs the horizontal reference axis $V_0$ upward by the angle $\phi c$. Thereby, even if the vehicle V is inclined, the LIDAR unit 100 can correctly detect the object $OB_L$ in the low position and the object $OB_H$ in the high position.

Next, specific processing of the above-mentioned correction will be described. By referring to FIG. 1, the attitude angle detector 6 detects the inclination of the vehicle. The inclination of the vehicle is represented by the inclination direction $\theta_{dir}$ indicating the direction in which the vehicle is inclined in the horizontal plane, and the inclination angle $\theta_{tilt}$ which is an inclination angle of the vehicle in the vertical plane. Then, the signal processor 2 calculates a corrected vertical angle $\phi$ by the following equations (2) based on the inclination direction $\theta_{dir}$ and the inclination angle $\theta_{tilt}$ which are supplied from the attitude angle detector 6. The equations (2) are approximate equations fulfilled in a range where the inclination angle is small, e.g., $\phi_{tilt} < 30°$. Since the corrected vertical angle $\phi$ is expressed as a simple function of the horizontal scanning angle $\theta'$, the equations (2) are suitable for the implementation of the control.

$$\omega = 2\pi n f_{frame} \quad (2)$$
$$\theta = \mathrm{mod}(\omega t, 2\pi)$$
$$\theta' = \mathrm{mod}(\omega t, 2\pi n)$$
$$\begin{cases} \phi = \dfrac{\phi_H - \phi_L}{2\pi n}\theta' + \phi_L - \phi_{tilt}\cos(\theta' - \theta_{dir}) & 0 \le \theta' < \theta'_t \\ \phi = g(\theta' - \theta'_t) - \phi_{tilt}\cos(\theta' - \theta_{dir}) & \theta'_t \le \theta' < 2\pi n \end{cases}$$

Then, the signal processor 2 supplies the corrected vertical angle $\phi$ thus calculated to the scanning angle controller 4 as the target vertical angle $\phi_x$. The scanning angle controller 4 controls the vertical angle of the transmission light pulses Pt based on the target vertical angle $\phi_x$ thus inputted. In this way, it becomes possible to appropriately correct variation of the helical scanning range caused by the inclination of the vehicle.

Figure 10A:
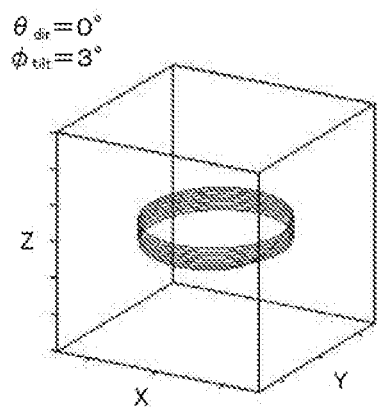
FIGS. 10A to 10D illustrate an example of a locus of the adaptive helical scanning according to a first embodiment.
Figure 10B:
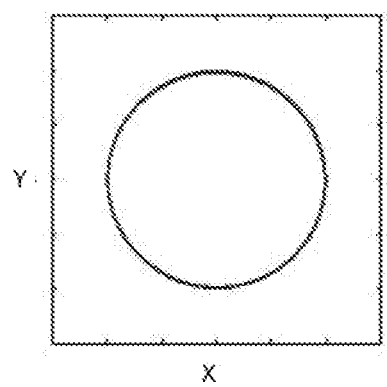
Figure 10C:
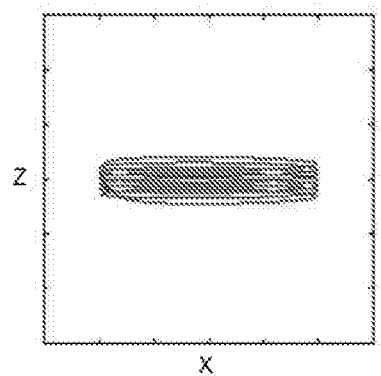
Figure 10D:
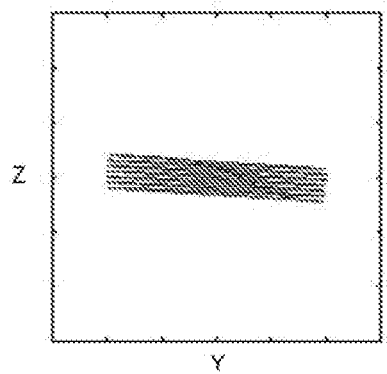

FIGS. 10A to 10D illustrate an example of a locus of the helical scanning when the inclination direction $\theta_{dir}=0°$ and the inclination angle $\phi_{tilt}=3°$. It is noted that the inclination angle $\phi_{tilt}$ indicates the upward direction of the horizontal direction by a positive value and the downward direction of the horizontal direction by a negative value. FIG. 10A is a perspective view of the helical scanning after the correction, FIG. 10B is an XY plan view, FIG. 10C is an XZ plan view and FIG. 10D is a YZ plan view.

Figure 11A:
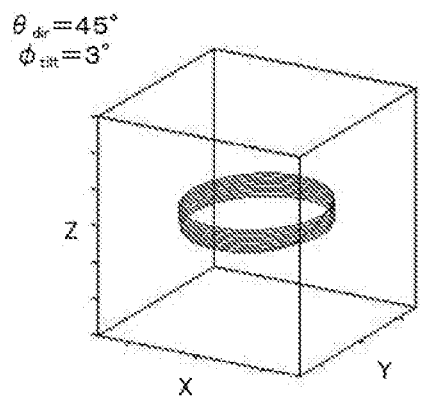
FIGS. 11A to 11D illustrate another example of a locus of the adaptive helical scanning according to the first embodiment.
Figure 11B:
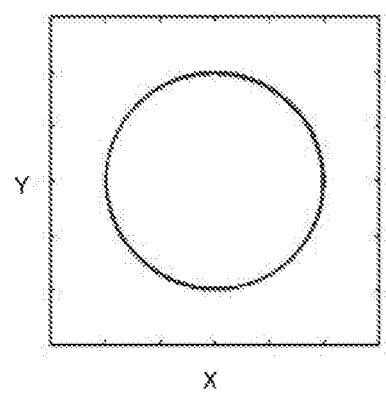
Figure 11C:
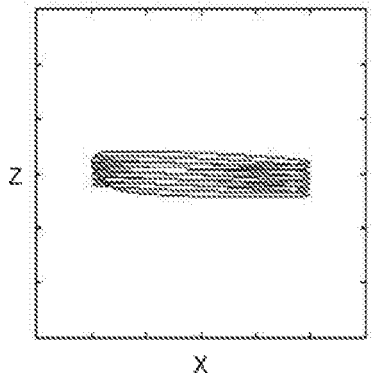
Figure 11D:
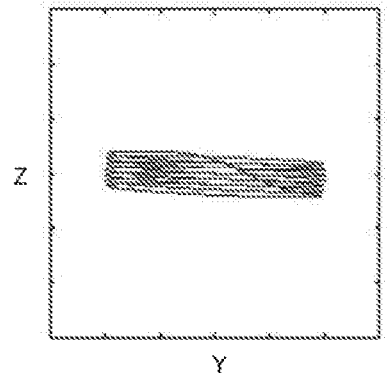

FIGS. 11A to 11D illustrate an example of a locus of the helical scanning when the inclination direction $\theta_{dir}=45°$ and the inclination angle $\phi_{tilt}=3°$. FIG. 11A is a perspective view of the helical scanning after the correction, FIG. 11B is an XY plan view, FIG. 11C is an XZ plan view and FIG. 11D is a YZ plan view.

Figure 12A:
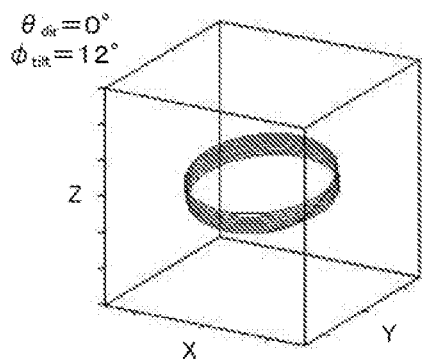
FIGS. 12A to 12D illustrate still another example of a locus of the adaptive helical scanning according to the first embodiment.
Figure 12B:
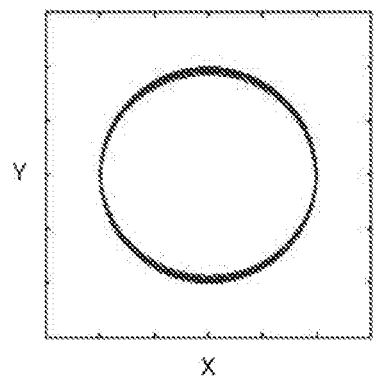
Figure 12C:
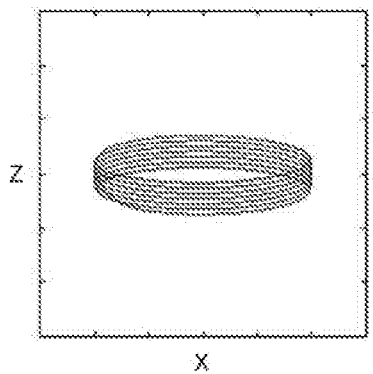
Figure 12D:
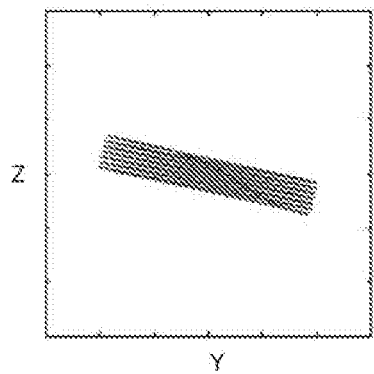

FIGS. 12A to 12D illustrate an example of a locus of the helical scanning when the inclination direction $\theta_{dir}=0°$ and the inclination angle $\phi_{tilt}=12°$. FIG. 12A is a perspective view of the helical scanning after the correction, FIG. 12B is an XY plan view, FIG. 12C is an XZ plan view and FIG. 12D is a YZ plan view.

Figure 13A:
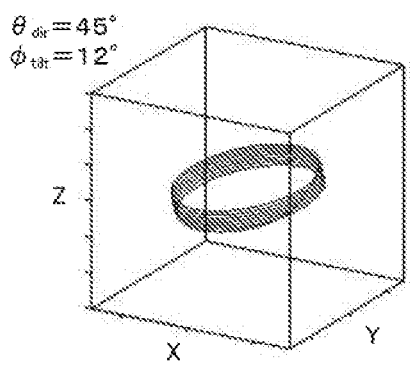
FIGS. 13A to 13D illustrate still another example of a locus of the adaptive helical scanning according to the first embodiment.
Figure 13B:
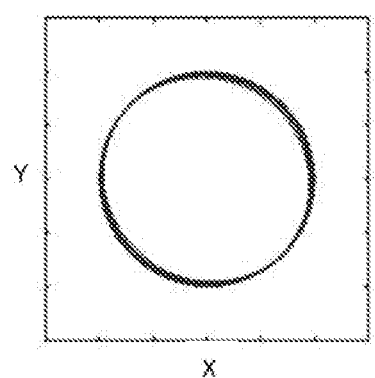
Figure 13C:
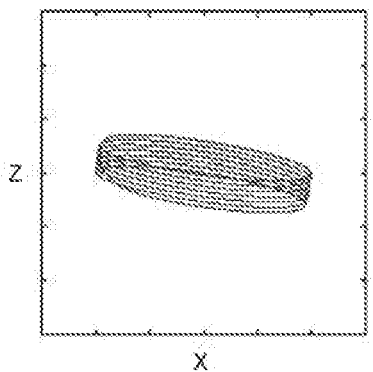
Figure 13D:
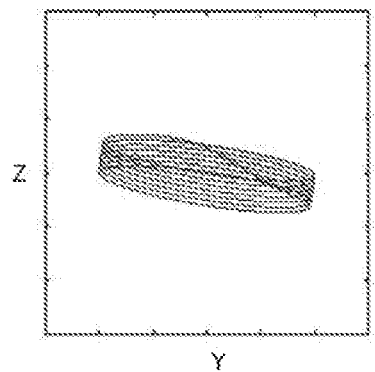

FIGS. 13A to 13D illustrate an example of a locus of the helical scanning when the inclination direction $\theta_{dir}=45°$ and the inclination angle $\phi_{tilt}=12°$. FIG. 13A is a perspective view of the helical scanning after the correction, FIG. 13B is an XY plan view, FIG. 13C is an XZ plan view and FIG. 13D is a YZ plan view.

Figure 14:
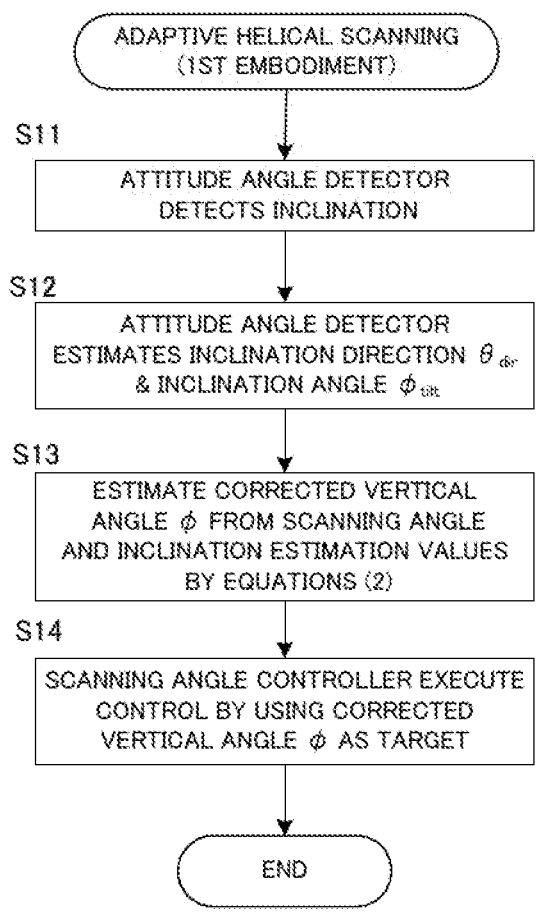
FIG. 14 is a flowchart of the adaptive helical scanning according to the first embodiment.

Next, the processing of the above-mentioned adaptive helical scanning will be described. FIG. 14 is a flowchart of the adaptive helical scanning according to the first embodiment. First, the attitude angle detector 6 detects the inclination of the vehicle (step S11). Next, the attitude angle detector 6 estimates the inclination direction $\theta_{dir}$ and the inclination angle $\phi_{tilt}$ of the vehicle (step S12). The inclination direction $\theta_{dir}$ and the inclination angle $\phi_{tilt}$ thus estimated (hereinafter referred to as "inclination estimation values") are supplied to the signal processor 2.

The signal processor 2 calculates the corrected vertical angle $\phi$ by the equations (2) based on the vertical angle $\theta$ detected by the scanning angle detector 5 and the inclination estimation values estimated by the attitude angle detector 6 (step S13). The corrected vertical angle $\phi$ thus calculated is supplied to the scanning angle controller 4 as the target vertical angle $\phi_x$. Then, the scanning angle controller 4 controls the vertical angle $\phi$ of the transmission light pulses Pr based on the target vertical angle $\phi_x$ (step S14).

(ii) 2nd Embodiment

Figure 15:
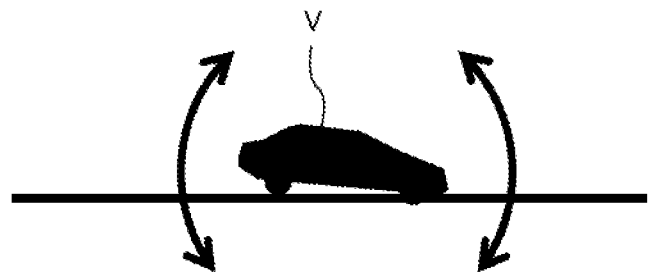
FIG. 15 schematically illustrates a pitching movement of a vehicle.

The second embodiment relates to the adaptive helical scanning when the vehicle is in the pitching movement. As schematically shown in FIG. 15, due to the condition of the road surface on which the vehicle is running, the pitching movement which is a movement in the pitch direction may occur to the vehicle V. The direction of the light beam emitted from the omnidirectional scanning unit 3 may vary due to the pitching movement. Therefore, in the second embodiment, the LIDAR unit 100 detects the pitching movement of the vehicle V, and corrects the vertical angle of the light beam emitted from the omnidirectional scanning unit 3 accordingly.

Specifically, by referring to FIG. 1, the attitude angle detector 6 detects the pitching movement of the vehicle. The pitching movement of the vehicle is represented by the direction $\theta_{dir}$, the frequency $f_{pitch}$ and the amplitude $\phi_{pitch}$ of the pitching movement and the phase shift $p_{pitch}$ of the pitching movement with respect to the frame time. The signal processor 2 calculates a corrected vertical angle $\phi$ by the following equations (3) based on the above values supplied from the attitude angle detector 6.

$$\omega = 2\pi n f_{frame} \quad (3)$$
$$\theta = \mathrm{mod}(\omega t, 2\pi)$$
$$\theta' = \mathrm{mod}(\omega t, 2\pi n)$$
$$\begin{cases} \phi = \dfrac{\phi_H - \phi_L}{2\pi n}\theta' + \phi_L - \phi_{pitch}\sin \\ \quad (2\pi f_{pitch} t + p_{pitch})\cos(\theta' - \theta_{dir}) & 0 \le \theta' < \theta'_t \\ \phi = g(\theta' - \theta'_t) - \phi_{pitch}\sin \\ \quad (2\pi f_{pitch} t + p_{pitch})\cos(\theta' - \theta_{dir}) & \theta'_t \le \theta' < 2\pi n \end{cases}$$

Then, the signal processor 2 supplies the corrected vertical angle $\phi$ thus calculated to the scanning angle controller 4 as the target vertical angle $\phi_x$. The scanning angle controller 4 controls the vertical angle of the transmission light pulses Pt based on the target vertical angle $\phi_x$ thus inputted. In this way, it becomes possible to appropriately correct variation of the helical scanning range caused by the inclination of the vehicle.

Figure 16A:
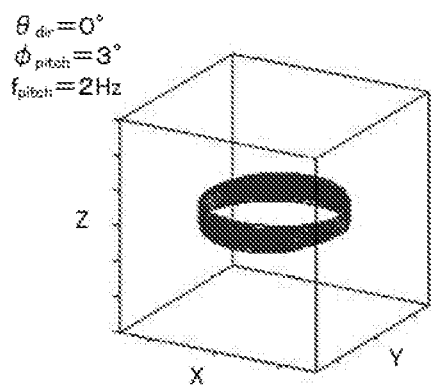
FIGS. 16A to 16D illustrate an example of a locus of an adaptive helical scanning according to a second embodiment.
Figure 16B:
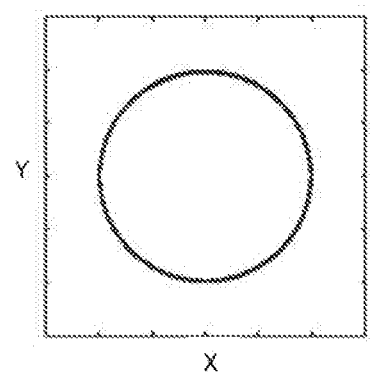
Figure 16C:
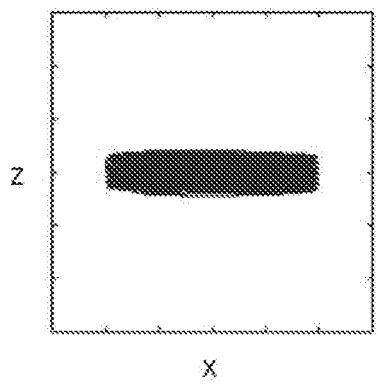
Figure 16D:
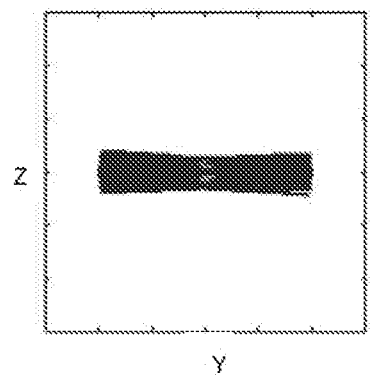

FIGS. 16A to 16D illustrate an example of a locus of the helical scanning when the pitching movement has the direction $\theta_{dir}=0°$, the amplitude $\phi_{pitch}=3°$ and the frequency $f_{pitch}=2$ Hz. It is noted that the amplitude $\phi_{pitch}$ indicates the upward direction of the horizontal direction by a positive value and the downward direction of the horizontal direction by a negative value. FIG. 16A is a perspective view of the helical scanning after the correction, FIG. 16B is an XY plan view, FIG. 16C is an XZ plan view and FIG. 16D is a YZ plan view.

Figure 17:
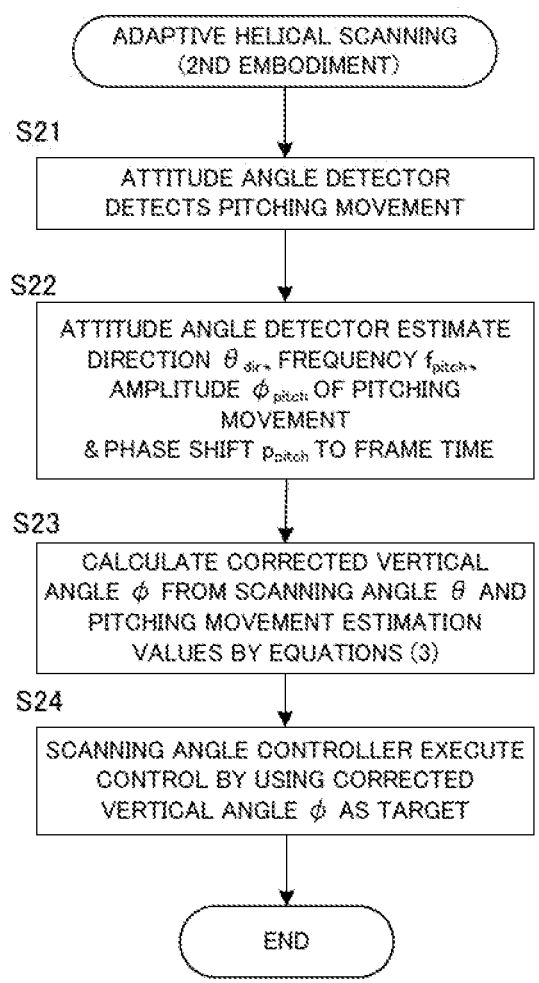
FIG. 17 is a flowchart of the adaptive helical scanning according to the second embodiment.

Next, the processing of the above-mentioned adaptive helical scanning will be described. FIG. 17 is a flowchart of the adaptive helical scanning according to the second embodiment. First, the attitude angle detector 6 detects the pitching movement of the vehicle (step S21). Next, the attitude angle detector 6 estimates the direction $\theta_{dir}$, the frequency $f_{pitch}$ and the amplitude $\phi_{pitch}$ of the pitching movement and the phase shift $p_{pitch}$ of the pitching movement with respect to the frame time, as the pitching movement estimation values (step S22). The pitching movement estimation values thus obtained are supplied to the signal processor 2.

The signal processor 2 calculates the corrected vertical angle $\phi$ by the equations (3) based on the vertical angle $\theta$ detected by the scanning angle detector 5 and the pitching-movement estimation values estimated by the attitude angle detector 6 (step S23). The corrected vertical angle $\phi$ thus calculated is supplied to the scanning angle controller 4 as the target vertical angle $\phi_x$. Then, the scanning angle controller 4 controls the vertical angle $\phi$ of the transmission light pulses Pr based on the target vertical angle $\phi_x$ (step S24).

MODIFIED EXAMPLES

In the above embodiments, the number of the layers of the helical scanning is seven. However, this is merely an example, and the scanning may be performed for arbitrary number of layers. Further, while the emission direction is moved from the lowermost layer to the uppermost layer with increasing the vertical angle $\phi$ in the above embodiments, the emission direction may be moved from the uppermost layer to the lowermost layer with decreasing the vertical angle $\phi$.

Further, while the correction processing is performed for the pitching movement in the above embodiment, the correction processing may be performed for a rolling movement.

INDUSTRIAL APPLICABILITY

This invention can be used for a technique of acquiring surrounding environment information by emitting the laser light.

BRIEF DESCRIPTION OF REFERENCE NUMBERS

1 Light transmission/reception unit
2 Signal processor
3 Omnidirectional scanning unit
4 Scanning angle controller
5 Scanning angle detector
13 Laser diode
16 Light receiving element

The invention claimed is:
1. A light control device mounted on a movable body, comprising:
  an emission unit configured to emit a light such that an emission direction continuously moves in a scanning range;
  a light receiving unit configured to receive the light reflected by an object;

an acquisition unit configured to acquire inclination information related to an inclination of the movable body; and a controller configured to control the emission unit to change a direction of the scanning range based on the inclination information, wherein the inclination information includes a directional angle of a pitching movement of the movable body in a first direction, an amplitude angle of the pitching movement in a second direction crossing the first direction, and a frequency of the pitching movement.

2. The light control device according to claim 1, wherein the emission unit continuously moves the emission direction of the light in the scanning range such that a transition locus of the light becomes helical.

3. The light control device according to claim 1, further comprising a detector configured to detect at least one of a distance to the object and an angle of the object, based on light receiving result of the light receiving unit.

4. A light control method executed by a light control device mounted on a movable body and comprising an emission unit configured to emit a light such that an emission direction continuously moves in a scanning range; and a light receiving unit configured to receive the light reflected by an object, the method comprising:

acquiring inclination information related to an inclination of the movable body; and controlling the emission unit to change a direction of the scanning range based on the inclination information, wherein the inclination information includes a directional angle of a pitching movement of the movable body in a first direction, an amplitude angle of the pitching movement in a second direction crossing the first direction, and a frequency of the pitching movement.

5. A non-transitory computer-readable medium storing a program executed by a light control device mounted on a movable body and comprising an emission unit configured to emit a light such that an emission direction continuously moves in a scanning range; a light receiving unit configured to receive the light reflected by an object; and a computer, the program causing the computer to function as:

an acquisition unit configured to acquire inclination information related to an inclination of the movable body; and a controller configured to control the emission unit to change a direction of the scanning range based on the inclination information, wherein the inclination information includes a directional angle of a pitching movement of the movable body in a first direction, an amplitude angle of the pitching movement in a second direction crossing the first direction, and a frequency of the pitching movement.

\* \* \* \* \*